United States Patent
Kraemer et al.

(10) Patent No.: US 11,102,223 B2
(45) Date of Patent: *Aug. 24, 2021

(54) MULTI-HOST THREAT TRACKING

(71) Applicant: Carbon Black, Inc., Waltham, MA (US)

(72) Inventors: Jeffrey Albin Kraemer, Wellesley, MA (US); Ranganathan Gopalan, Wayland, MA (US)

(73) Assignee: Carbon Black, Inc., Palo Alto, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 16/454,680

(22) Filed: Jun. 27, 2019

(65) Prior Publication Data

US 2019/0319973 A1    Oct. 17, 2019

Related U.S. Application Data

(63) Continuation of application No. 15/457,756, filed on Mar. 13, 2017, now Pat. No. 10,375,089.
(Continued)

(51) Int. Cl.
*H04L 29/06*     (2006.01)
*G06F 21/56*     (2013.01)
(Continued)

(52) U.S. Cl.
CPC ........ *H04L 63/1416* (2013.01); *G06F 21/562* (2013.01); *G06F 21/577* (2013.01);
(Continued)

(58) Field of Classification Search
CPC ... H04L 63/1416; H04L 63/145; H04L 63/14; H04L 63/20; G06F 21/562; G06F 21/577; G06F 2201/86; G06Q 10/0635
See application file for complete search history.

(56) References Cited

U.S. PATENT DOCUMENTS 5,974,549 A    10/1999  Golan
8,015,604 B1    9/2011  Tidwell et al.
(Continued)

FOREIGN PATENT DOCUMENTS

EP    2 750 069    7/2014
GB    2502774    12/2013
(Continued)

OTHER PUBLICATIONS

Burger, E. et al., "Taxonomy Model for Cyber Threat Intelligence Information Exchange Technologies," Information Sharing & Collaborative Security, ACM, New York, Nov. 3, 2014, pp. 51-60. Ten pages.
(Continued)

*Primary Examiner* — Ayoub Alata

(57) ABSTRACT

A system and method for tracking data security threats within an organization is proposed. A threat aggregator process executing on an analysis computer system within the organization receives events indicating possible threats observed by and sent from different user devices and aggregates related events into threats. This enables the threats to be analyzed and acted upon at a level of the organization (e.g., across user devices) rather than at the level of the individual user devices. An endpoint telemetry system analyzes threats sent from the aggregator and provides security policies for responding to the threats. In examples, the system can identify attacks of related threats and act upon the related threats of the attack collectively, and can characterize false positive threats sent from multiple user devices as a single extraneous threat. This has advantages over the per-user device focus for responding to threats provided by current systems and methods.

24 Claims, 7 Drawing Sheets

Related U.S. Application Data

(60) Provisional application No. 62/308,305, filed on Mar. 15, 2016.

(51) Int. Cl.
   *G06F 21/57* (2013.01)
   *G06Q 10/06* (2012.01)

(52) U.S. Cl.
   CPC ........ *H04L 63/145* (2013.01); *G06F 2201/86* (2013.01); *G06Q 10/0635* (2013.01); *H04L 63/14* (2013.01); *H04L 63/20* (2013.01)

(56) References Cited

U.S. PATENT DOCUMENTS

| | | | |
|---|---|---|---|
| 8,839,435 | B1 | 9/2014 | King |
| 9,165,142 | B1 | 10/2015 | Sanders et al. |
| 9,336,385 | B1 * | 5/2016 | Spencer ................. G06F 21/56 |
| 9,648,045 | B2 | 5/2017 | Mooring et al. |
| 2006/0277539 | A1 | 12/2006 | Amarasinghe et al. |
| 2007/0150957 | A1 | 6/2007 | Hartrell et al. |
| 2008/0144821 | A1 | 6/2008 | Armstrong |
| 2009/0126017 | A1 | 5/2009 | Chahal |
| 2009/0193513 | A1 | 7/2009 | Agarwal et al. |
| 2010/0017879 | A1 | 1/2010 | Kuegler et al. |
| 2010/0031361 | A1 | 2/2010 | Shukla |
| 2010/0077481 | A1 | 3/2010 | Polyakov et al. |
| 2013/0047255 | A1 | 2/2013 | Dalcher |
| 2013/0283370 | A1 | 10/2013 | Vipat et al. |
| 2014/0196148 | A1 | 7/2014 | Chahal |
| 2015/0128274 | A1 | 5/2015 | Giokas |
| 2015/0326592 | A1 | 11/2015 | Vissamsetty et al. |
| 2015/0332048 | A1 | 11/2015 | Mooring et al. |
| 2015/0334126 | A1 | 11/2015 | Mooring et al. |
| 2016/0072836 | A1 | 3/2016 | Hadden et al. |
| 2016/0164893 | A1 * | 6/2016 | Levi ...................... G06F 16/215 726/23 |
| 2017/0052821 | A1 * | 2/2017 | Wu ...................... G06F 11/3006 |
| 2017/0124327 | A1 | 5/2017 | Kumbhar et al. |
| 2017/0270296 | A1 | 9/2017 | Kraemer et al. |
| 2017/0272462 | A1 | 9/2017 | Kraemer et al. |
| 2017/0272469 | A1 | 9/2017 | Kraemer et al. |
| 2018/0091540 | A1 | 3/2018 | Solow et al. |

FOREIGN PATENT DOCUMENTS

| | | |
|---|---|---|
| WO | WO 2015/009296 | 1/2015 |
| WO | WO 2017/003597 | 1/2017 |
| WO | WO 2017/160760 | 9/2017 |
| WO | WO 2017/160765 | 9/2017 |
| WO | WO 2017/160772 | 9/2017 |

OTHER PUBLICATIONS

Harrell, C., "Process Hollowing Meets Cuckoo Sandbox", Feb. 2015, Journey Into Incident Response, pp. 1-7.

Hunt, G. et al., "Detours: Binary Interception of Win32 Function," Proceedings of the 3rd USENIX Windows NT Symposium, Seattle, WA, Jul. 12-13, 1999. Ten pages.

International Search Report and the Written Opinion of the International Searching Authority, dated May 24, 2017, from International Application No. PCT/US2017/022181, filed on Mar. 13, 2017. Fourteen pages.

International Search Report and the Written Opinion of the International Searching Authority, dated May 26, 2017, from International Application No. PCT/US2017/022167, filed on Mar. 13, 2017. Twelve pages.

International Search Report and the Written Opinion of the International Searching Authority, dated May 8, 2017, from International Application No. PCT/US2017/022173, filed on Mar. 13, 2017. Sixteen pages.

International Search Report and the Written Opinion of the International Searching Authority, dated May 8, 2017, from International Application No. PCT/US2017/022184, filed on Mar. 13, 2017. Fifteen pages.

Leitch, J., "Process Hollowing," http://www.autosectools.com, Nov. 1, 2014. Ten pages.

Monti, E.,"Analyzing Malware Hollow Processes", Mar. 2011, Spiderlabs Blog, trustwave.com, pp. 1 -12.

Nayyar, H., "An Opportunity in Crisis", 2014, SANS Institute, pp. 1-94.

VirtuaiAllocEx function, 2017, microsoft.com, pp. 1-6.

International Preliminary Report on Patentability, dated Sep. 27, 2018, from International Application No. PCT/US2017/022181, filed on Mar. 13, 2017. Eight pages.

International Preliminary Report on Patentability, dated Sep. 27, 2018, from International Application No. PCT/US2017/022167, filed on Mar. 13, 2017. Six pages.

International Preliminary Report on Patentability, dated Sep. 27, 2018, from International Application No. PCT/US2017/022173, filed on Mar. 13, 2017. Nine pages.

International Preliminary Report on Patentability, dated Sep. 27, 2018, from International Application No. PCT/US2017/022184, filed on Mar. 13, 2017. Eight pages.

* cited by examiner

MULTI-HOST THREAT TRACKING

RELATED APPLICATIONS

This application is a Continuation of U.S. patent application Ser. No. 15/457,756, filed on Mar. 13, 2017, which claims the benefit under 35 USC 119(e) of U.S. Provisional Application No. 62/308,305 filed on Mar. 15, 2016, both of which are incorporated herein by reference in their entirety.

BACKGROUND OF THE INVENTION

Data security threats pose a major operational and financial risk for individual persons and businesses. The threats typically occur due to attacks upon enterprise networks of businesses. Typically, the attacks utilize malicious computer software, or malware, that targets devices within the enterprise networks. In examples, the target devices include data communications equipment such as firewalls, user account databases, information servers, protocol routers, and user devices. Examples of user devices include smartphones, tablet computing devices, and laptop computers running operating systems such as Windows, Android, Linux, or IOS, in examples. Windows is a registered trademark of Microsoft Corporation. Android is a registered trademark of Google, Inc. IOS is a registered trademark of Apple, Inc.

Attack actors use a variety of techniques to launch attacks upon user devices in enterprise networks. The techniques or actions that the actors take when launching their attacks are also referred to collectively as Tools, Tactics, and Procedures (TTPs). Attacks are often designed to disrupt network communications, gain control over computers or networks, or secretly gather personal information about users, businesses, and government entities. The attacks often utilize malware to compromise processes executing on the user devices. Examples of malware include viruses, trojans, adware, and spyware, to list a few examples. Analysis of TTPs and the malware utilized therein can provide useful information for attributing an attack to a specific actor, and to predict future attacks, in examples.

SUMMARY OF THE INVENTION

Businesses are increasingly utilizing data security systems to identify potential data security threats within their enterprise networks. The systems are typically deployed as a network-level service that monitors data traffic over the enterprise network and analyzes the data traffic for indicia of attacks. The systems can then send messages that include information concerning the potential attacks to security personnel such as incident responders via email or data logging via a Security Information and Event Manager ("SIEM"). From this information, the incident responders can take actions upon the user devices in response to the potential threats.

Current systems and methods for identifying security threats in organizations have limitations. In one example, current systems typically identify security threats at the level of the individual user devices, from discrete events observed by the user devices. The discrete events may or may not be associated with actual security threats. For example, a specific user device creates an event describing a policy violation detected on the user device, and a threat analysis system determines whether the policy violation described by the event is associated with a known data security issue and executes an action (e.g. "quarantine") upon the user device in response. Because current systems do not analyze/correlate events across user devices, many events that individually may not indicative of a threat but could be part of a larger threat involving multiple devices are often ignored or missed. Moreover, the volume of events generated from user devices can become a nuisance or a distraction, causing security managers to direct their attention to other matters. This also can result in security managers overlooking important events being missed or not associated with other relevant data, which might be indicative of an attack.

In contrast, the present invention can track events sent from multiple user devices to determine and remediate threats at the level of the organization. For this purpose, a threat aggregator service ("threat aggregator") executing on an analysis computer system within an organization analyzes information in the events sent from different user devices. The analysis computer system and the user devices communicate over the enterprise network within each organization. The threat aggregator compares the information in the events to TTPs of known data security issues, and then correlates information across the events to identify TTPs exhibited by processes across different user devices over a given time. The threat aggregator then creates threats that include related events associated with known data security issues. The aggregation of related events from one or more user devices into threats allows the related events of each threat to be viewed at an organizational level, rather than as discrete events at the level of each host/user device.

An endpoint telemetry system of the system can then view the threats to determine whether the threats (and therefore determine whether the events of the threats) describe a larger "attack" upon the organization. The endpoint telemetry system also provides security policies that specify actions for responding to the threats. When viewed across a plurality of user devices in this manner, the threats can be remediated at an organizational level. In addition, when the threats are determined to be extraneous or associated with "false positives," the events of the threats may also be identified as being extraneous and discarded at the organizational level. This identification and aggregation can dramatically improve the understanding of the scope of an attack, and manage the associated workflow for both remediation and of both true and false positives. It also allows for attribution of a threat to a specific threat actor and an attack campaign targeting an organization.

In general, according to one aspect, the invention features a method for responding to data security threats ("threats") in an organization. The method comprises a threat aggregator service ("threat aggregator") executing on an analysis computer system receiving events sent from and observed by user devices within the organization and an endpoint telemetry system identifying possible attacks upon the organization based on the threats. The threat aggregator creates and/or updates threats based on the events, wherein the threats include one or more events associated with known data security issues, and the endpoint telemetry system determines whether the possible attacks are associated with known attacks and provides security policies that specify actions for responding to the threats.

Additionally, the threat aggregator determines that the events of the threats are associated with known data security issues by comparing event information of the events to Tools/Tactics/Procedures (TTPs) of known data security issues, and appending TTPs of the known data security issues to the matching events.

Typically, the events include a description that characterizes each event, where the description includes summary text that describes the event, a name and/or an identifier of the user device that sent the event, and a name and/or an identifier of at least one application executing on the user device, the at least one application identified as being a source of the event.

The threat aggregator can create and/or update threats based on the events by receiving an event from a user device, creating a threat based on the event when no threats exist and/or when a description of the event does not match descriptions of existing threats, adding the event to the created threat and copying the description of the event to the description of the created threat, and updating an existing threat to include the event when the description of the event matches a description of the existing threat.

The threat aggregator can also create and/or update threats based on the events by receiving an event from a user device, creating a threat based on the event when no threats exist and/or when one or more fields within the description of the event do not match corresponding fields within the descriptions of existing threats, adding the event to the created threat and copying the description of the event to the description of the created threat, and updating an existing threat to include the event when one or more fields within the description of the event match one or more corresponding fields within the description of the existing threat.

The threat aggregator might also create and/or update threats based on the events by identifying a list of one or more user devices affected by the threats from the events within each of the threats, and including the list of the one or more user devices affected by the threats in the threat descriptions of the threats.

The method can additionally comprise a Security Information and Event Manager (SIEM) within the organization receiving threats sent from the threat aggregator, storing the threats in log files, and providing the log files including the threats to the endpoint telemetry system.

The endpoint telemetry system preferably identifies possible attacks upon the organization based on the threats by matching fields within descriptions of the threats to determine whether the threats are related, and associating the related threats with possible attacks.

Typically, the endpoint telemetry system determines whether the possible attacks are associated with known attacks and provides security policies that specify actions for responding to the threats by matching the possible attacks to records of known extraneous threats and/or of false positive threats, and sends a description of the possible attacks matching the records of known extraneous threats and/or of false positive threats in conjunction with a discard action to the threat aggregator. The threat aggregator will discard locally stored threats having a description matching the received description of the possible attacks and/or discard any subsequent events received from user devices having a description matching the received description of the possible attacks.

The endpoint telemetry system can also determine whether the possible attacks are associated with known attacks and provide security policies that specify actions for responding to the threats by matching each possible attack to records of known attacks. Upon determining that the possible attacks are known attacks that are also malicious in nature, it can send descriptions of the known attacks in conjunction with remediation actions to the threat aggregator, the threat aggregator matching the descriptions of the attacks to descriptions of locally stored threats and executing the remediation actions upon the user devices associated with the matching locally stored threats.

In general, according to another aspect, the invention features a system for responding to data security threats in an organization. The system includes a threat aggregator service ("threat aggregator") executing upon an analysis computer system and includes an endpoint telemetry system. The threat aggregator receives events sent from and observed by user devices within the organization, and creates and/or updates threats based on the events. The endpoint telemetry system identifies possible attacks upon the organization based on the threats, and determines whether the possible attacks are associated with known attacks and provides security policies that specify actions for responding to the threats. The threats include one or more related events associated with known data security issues.

Preferably, the information of the events include details of each event and a description that characterizes each event that is derived from the event details, wherein the description includes a name of one or more applications associated with each event and/or an identifier for each of the one or more applications associated with each event, and summary text that describes each event.

Typically, the threats include one or more events that are related by a description of each of the events, and a threat description that includes contents of the event description of the one or more related events. In one example, the endpoint telemetry system is located in a network that is remote to the organization.

The system might also include a Security Information and Event Manager (SIEM) within the organization that receives threats sent from the threat aggregator, stores the threats in log files, and provides the log files including the threats to the endpoint telemetry system.

In one implementation, the threat aggregator creates and/or updates the threats based on the events by receiving an event from a user device, creating a threat based on the event when no threats exist and/or when a description of the event does not match descriptions of existing threats, and adding the event to the created threat and copying the description of the event to the description of the created threat, and updating an existing threat to include the event when the description of the event matches a description of the existing threat.

The threat aggregator might also create and/or update threats based on the events by receiving an event from a user device, creating a threat based on the event when no threats exist and/or when one or more fields within the description of the event do not match corresponding fields within the descriptions of existing threats, adding the event to the created threat and copying the description of the event to the description of the created threat, and updating an existing threat to include the event when one or more fields within the description of the event match one or more corresponding fields within the description of the existing threat.

The endpoint telemetry system can determine whether the possible attacks are associated with known attacks and provides security policies that specify actions for responding to the threats by matching each possible attack to records of known extraneous threats and/or of false positive threats, and sending a description of the possible attacks matching the records of known extraneous threats and/or of false positive threats in conjunction with a discard action to the threat aggregator. In response, the threat aggregator discards locally stored threats having a description matching the received description of the possible attacks and/or discarding any subsequent events received from user devices having a description matching the received description of the possible attacks.

The endpoint telemetry system can also determine whether the possible attacks are associated with known attacks and provides security policies that specify actions for responding to the threats by matching each possible attack to records of known attacks, and upon determining that the possible attacks are known attacks that are also malicious in nature, sends descriptions of the known malicious attacks in conjunction with remediation actions to the threat aggregator, and in response, the threat aggregator executes the remediation actions against locally stored threats having threat descriptions that match the descriptions of the known malicious attacks.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms of nouns and the articles "a", "an" and "the" are intended to include the plural forms as well, unless expressly stated otherwise. It will be further understood that the terms: includes, comprises, including and/or comprising, and the like, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
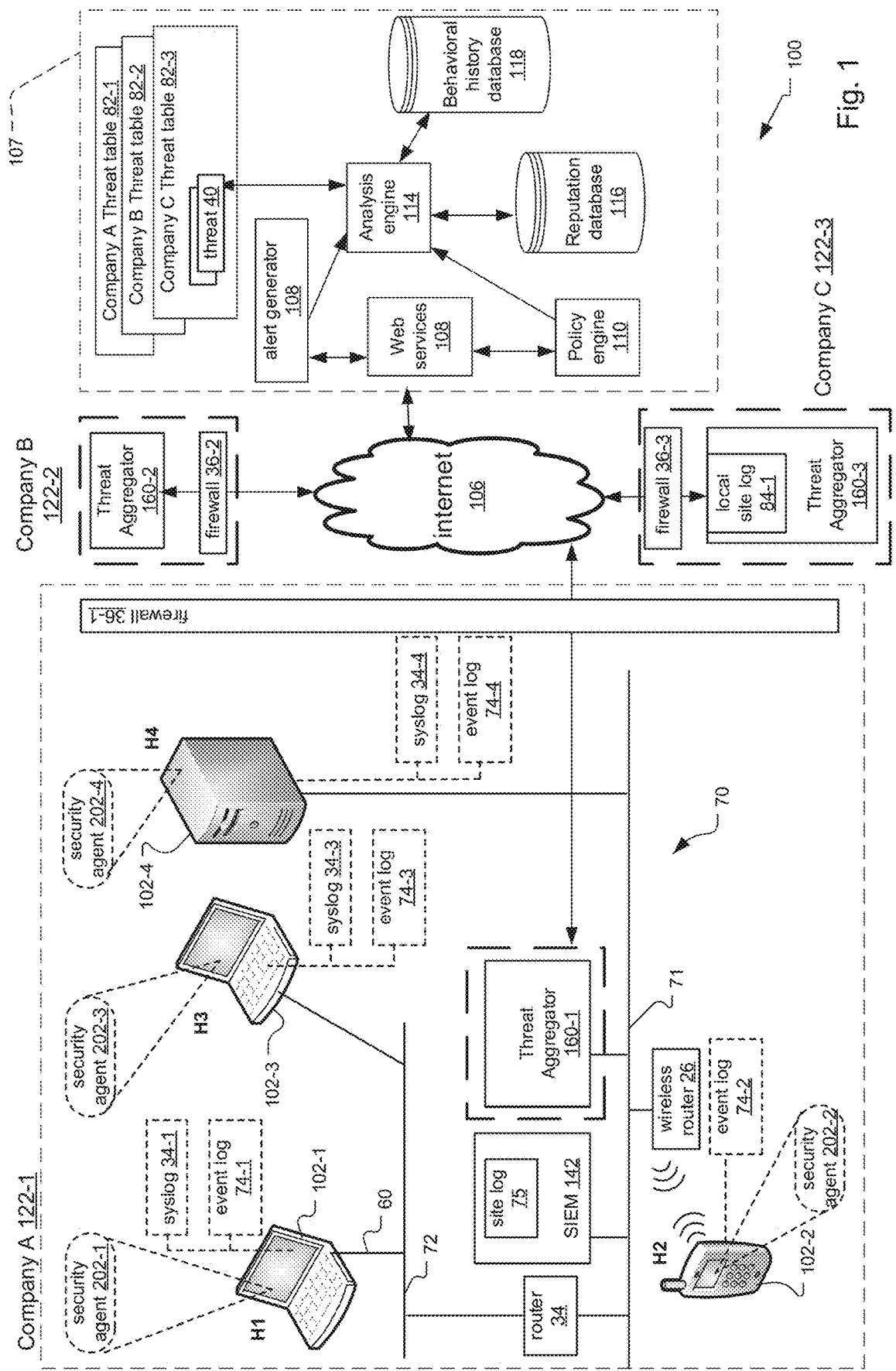
FIG. 1 is a schematic diagram of a distributed data security system that can identify data security threats involving multiple user devices within one or more organizations.

FIG. 1 shows a schematic diagram of an exemplary distributed data security system 100. The system 100 includes an endpoint telemetry aggregation system 107 which companies/organizations Company A, B, and C 122-1 through 122-3 access over the Internet 106 via firewalls 36-1 through 36-3, respectively. In this example, the endpoint telemetry aggregation system 107 is multitenant, where each company's data is securely stored in a logical database, private to each company. Details for Company A 122-1 are shown.

In the illustrated embodiment, the endpoint telemetry aggregation system 107 includes a web services component 108, a policy engine 110, and an analysis engine 114. The web services component 108 receives requests for security policies from user devices 102 and forwards the requests to the policy engine 110. The policy engine 110, in turn, searches for the security policies in a configuration and security policy database 112 and a reputation database 116. The analysis engine 114 calculates trust (or reputation) scores to determine the trustworthiness of the processes and whether the processes are malicious or benign, in examples.

In one embodiment, the endpoint telemetry aggregation system 107 is a Software as a Service ("SaaS") system located in a network that is remote to the enterprise networks 70 of the companies 122. The endpoint telemetry aggregation system 107 provides its services to one or more companies or business entities, which are clients of the endpoint telemetry aggregation system 107. In another embodiment, the endpoint telemetry aggregation system 107 is located within the enterprise networks 70 of the companies 122.

The endpoint telemetry aggregation system 107 also includes a behavioral information database 118 that stores behavioral information about applications received from user devices 102 and includes a whitelist/blacklist database 120 that stores records of whitelisted and blacklisted processes.

Company A 122-1 includes various user devices 102 that communicate over an enterprise network 70. Though companies 122 often include hundreds or thousands of user devices, but only four exemplary user devices 102-1 through 102-4 are shown. User device 102-2 with label H2 (e.g. for "host") and user device 102-4 with label H4 communicate over a main network 71 of the enterprise network 70, while user device 102-1 with label H1 and user device 102-3 with label H3 communicate over a subnet 72 of the enterprise network 70. The main network 71 and subnet 72 are connected via router 34. User devices H1 and H3 are laptop user devices, H4 is a server user device, while H2 is a mobile device. Mobile device H2 communicates with the other user devices via a wireless router 26 connected to the main network 71.

The user devices 102 include one or more security agent processes 202 ("security agent") that execute on an operating system of the user devices 102. Each security agent 102 observes behaviors associated with its user device 202 by monitoring the status of the operating system and the other processes that execute on the operating system, and monitoring data traffic on the enterprise network 70, in examples. The security agents 202 can then generate events 60 from these observations. The events 60 typically include information that has a potential security impact on the user devices 102 and its processes.

In examples, the security agent 202 generates events 60 in response to detecting new hardware plugged into the user device 102, detecting network traffic of a suspicious nature with a destination Internet Protocol (IP) address of the user device 102, or that a specific process has been compromised by malware. The security agent 202 stores the events 60 to log files within each user device 102, including a system-wide log file ("syslog") 34 and/or to an event log 74 dedicated for logging events 60. User devices H1 through H4 include security agents 202-1 through 202-4. User device H1 also includes syslog 34-1 and event log 74-1. User device H2 also includes event log 74-2. User device H3 also includes syslog 34-3 and event log 74-3. User device H4 also includes syslog 34-4 and event log 74-4.

Company A 122-1 also includes a SIEM 142. In the illustrated embodiment, the SIEM 142 includes a site log 75 that collects/receives events 60 from either the syslog 34 and/or event log 74 each of the user devices H1-H4 of the enterprise network 70.

Each of the Companies 122 also includes a threat aggregator 160. Preferably, the threat aggregator 160 is a service executing on at least one analysis computer system. In the preferred embodiment as shown in FIG. 1, the analysis computer system including the threat aggregator 160 is located within the enterprise networks 70 of the companies 122. Typically, the analysis computer system provides more resources that the user devices 102. These resources include additional memory, processing power/central processing unit (CPU) capability, and data storage, in examples. This enables the threat aggregator 160 to more efficiently analyze the events 60 sent from the user devices 102. In another embodiment, the threat aggregator 160/analysis computer system reside within the endpoint telemetry aggregation system 107.

In one embodiment, as shown in Company C 122-3, the threat aggregator 160-3 includes a local site log 84-1 that stores events 60 collected/received from either the syslog 34 and/or event log 74 each of the user devices 102. In another embodiment, as shown in Company A 122-1 and Company B 122-2, the threat aggregators 160-1/160-2 possibly collect/receive events 60 from the user devices 60 directly and additionally the threat aggregator 160-1 accesses events 60 from the site log 75 of the SIEM 142.

The threat aggregators 160 of each Company 122 create and classify threats in a common way based on the events sent from the user devices 102 within each Company 122 and send the threats 40 for further analysis to the endpoint telemetry aggregation system 107. The endpoint telemetry aggregation system 107 receives the threats 40 and stores the threats 40 separately for each of the companies 122. In one example, the endpoint telemetry aggregation system 107 maintains separate threat tables 82-1, 82-2, and 82-3 for Company A 122-1, Company B 122-2, and Company C 122-3, respectively.

Figure 2A:
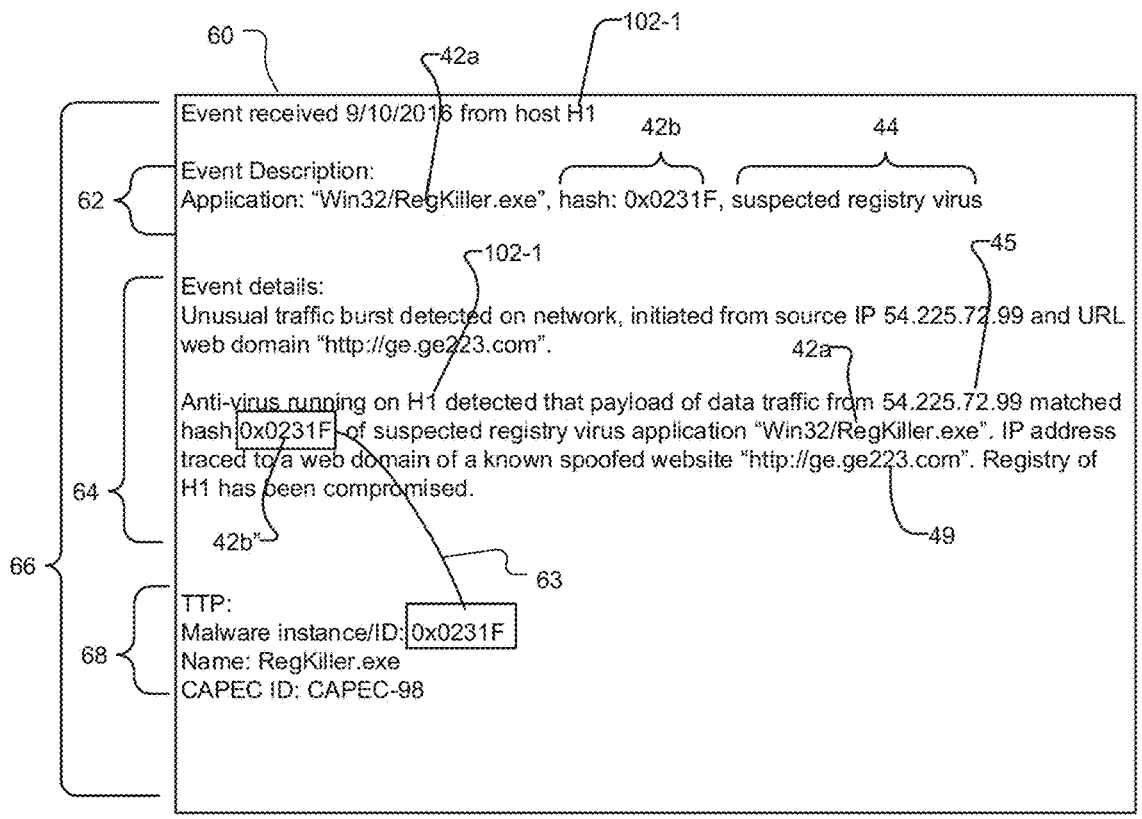
FIG. 2A is a block diagram showing event information of an exemplary event observed on a user device.

FIG. 2A shows detail for an exemplary event 60 observed on a user device 102, the contents of which are included herein below:

(Begin contents of event)
Event received Sep. 10, 2016 from host H1
Event Description:
Application: "Win32/RegKiller.exe", hash: 0x0231F, suspected registry virus
Event Details:
Unusual traffic burst detected on network, initiated from source IP 54.225.72.99 and URL web domain "http://ge.ge223.com".
Anti-virus running on H1 detected that payload of data traffic from 54.225.72.99
matched hash 0x0231F of suspected registry virus application
"Win32/RegKiller.exe". IP address traced to a web domain of a known spoofed
website "http://ge.ge223.com". Registry of H1 has been compromised.
TTP:
Malware instance/ID: 0x0231F
Name: RegKiller.exe
CAPEC ID: CAPEC-98
(End contents of event)

Each event 60 includes event information 66. The event information 66 includes a timestamp, an event description 62, and event details 64. In addition, the event information 66 can optionally include one or more TTPs 68 which the threat aggregator 160 appends to the event information 66 during analysis of the event 60.

TTPs 68 include actions and/or patterns of actions that attack actors have used in prior data security attacks, references to specific instances of malware identified in the attacks, and actions that the malware has executed upon processes of a target user device 102, in examples. Actions and/or patterns of actions in TTPs often use standardized descriptions from industry resources such as Common Attack Pattern Enumeration and Classification (CAPEC). In examples, the TTPs include descriptions of attacks initiated from a specific attack source device or domain name located in a rogue nation, and descriptions of attacks initiated from hundreds of ordinary consumer devices infected with malware that create a "botnet" distributed attack. Example references to malware and/or actions that malware has executed upon processes within TTPs include "malware dum.exe scraped memory from all processes," and "Trojan Mydoom with ID 0xd1cd612 compromised process desktop.exe."

The event details 64 include a full description of the event 60 and various data associated with the event such as a sender IP address 45, a domain name/URL 49, and an application name 42*a* and/or ID 42*b* (e.g. hash value) of one or more applications associated with the potential threat posed by the event 60, in examples.

The event description 62 characterizes the event and is typically derived from the event details 64. In one implementation, the description 62 includes separate fields separated by a delimiter such as a comma for easier parsing of the individual fields. The event description 62 includes summary text 44 describing the event, and the application name 42*a* and/or ID 42*b* of the one or more applications.

When a threat aggregator 160 determines whether an event 60 is associated with a known data security issue, in one example, the threat aggregator 160 compares the event information 66 of the event to one or more TTPs 68 of known data security issues. In the illustrated example, the threat aggregator 160 has determined that the event information 66 of the event 60 matches a TTPs 68 of a known data security issue obtained from the policy engine 110 of the endpoint telemetry system 107. The threat aggregator 160 then appends the contents of the matching TTP 68 to the event 60. Reference 63 illustrates the common ID 42*b* "0x0231F" between the event 60 and a TTP 68, where the TTP 68 has since been added to the event 60 in response.

Figure 2B:
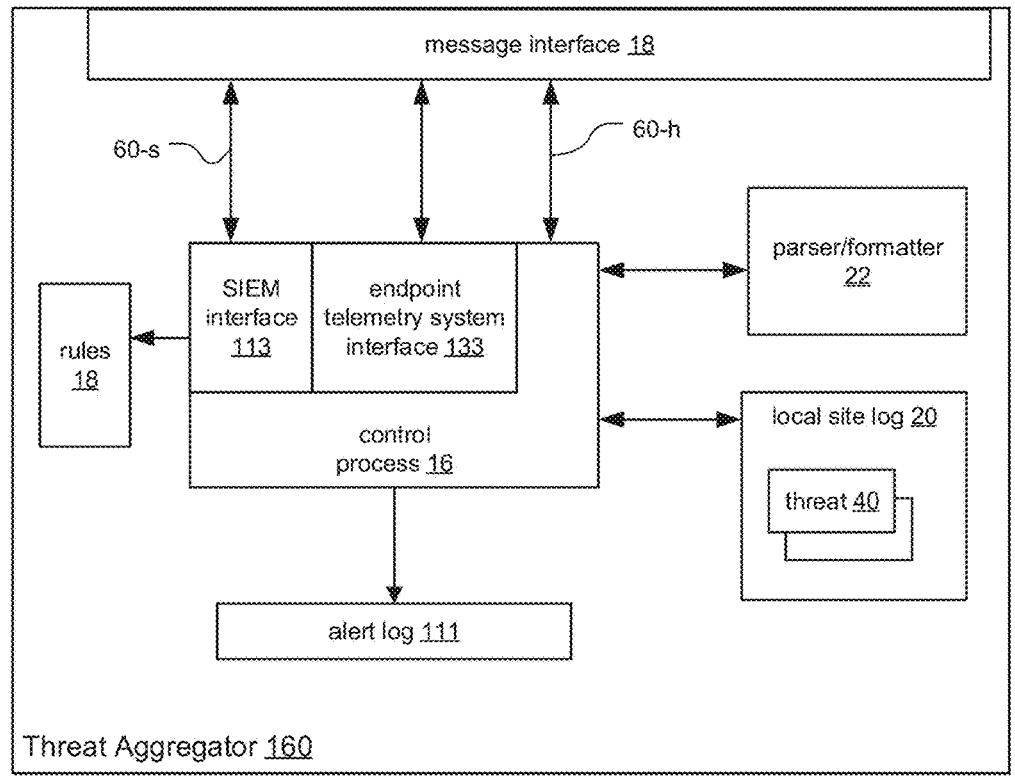
FIG. 2B is a schematic diagram showing detail of a threat aggregator service ("threat aggregator") that determines threats involving one or more user devices from analyzing events observed by and sent from the user devices.

FIG. 2B shows detail for an embodiment of a threat aggregator 160 within an enterprise network 70 of a company/organization 122. In the illustrated embodiment, the threat aggregator 160 includes sub-processes or modules such as a control process 16, a parser/formatter 22, a local site log 20, an alert log 111, rules 18, and a message interface 18. The control process 16 includes a SIEM interface 113 and an endpoint telemetry system 133 interface.

The control process 16 receives messages via the message interface 18, which extracts events 60 included within the messages. The control process can receive/access events 60-*s* from a SIEM 142 over the SIEM interface 113 or can receive/collect events 60-*h* directly from the user devices 102. The control process 16 then analyzes the information in the events 60 to determine whether the information 66 is associated with a known data security issue.

Via the SIEM interface 113, the control process 16 can periodically update its rules 18 from the policy engine 110 of the endpoint telemetry system 107. In examples, the rules 18 reference TTPs of known data security issues. Using its parser/formatter 22, the control process 16 opens each event 60 and applies the rules 18 to the information of the event to determine whether the information of each is associated with a known data security issue. For this purpose, in one example, the control process 16 compares the TTPs 68 referenced within the rules 18 to determine if the information of the event 60 "matches" that of a TTP 68.

The control process 16 creates new threat records ("threats") 40 that include the contents of at least one received event 60 that the control process 16 has determined is associated with an actual data security issue/threat. Upon receiving additional events 60, the control process 16 determines whether the additional events 60 are associated with known data security issues, and also determines whether each additional event 60 is related to a previously processed event 60 included within a threat 40. The control process 16 updates existing threats 40 to include related events 60, and/or creates new threats for the additional events 60 which are not related to any events 60 included within any existing threats 40. In response to identifying events 60 associated with known data security issues and creating threats 40, the control process creates a log entry in the alert log 111 for later analysis.

Figure 3:
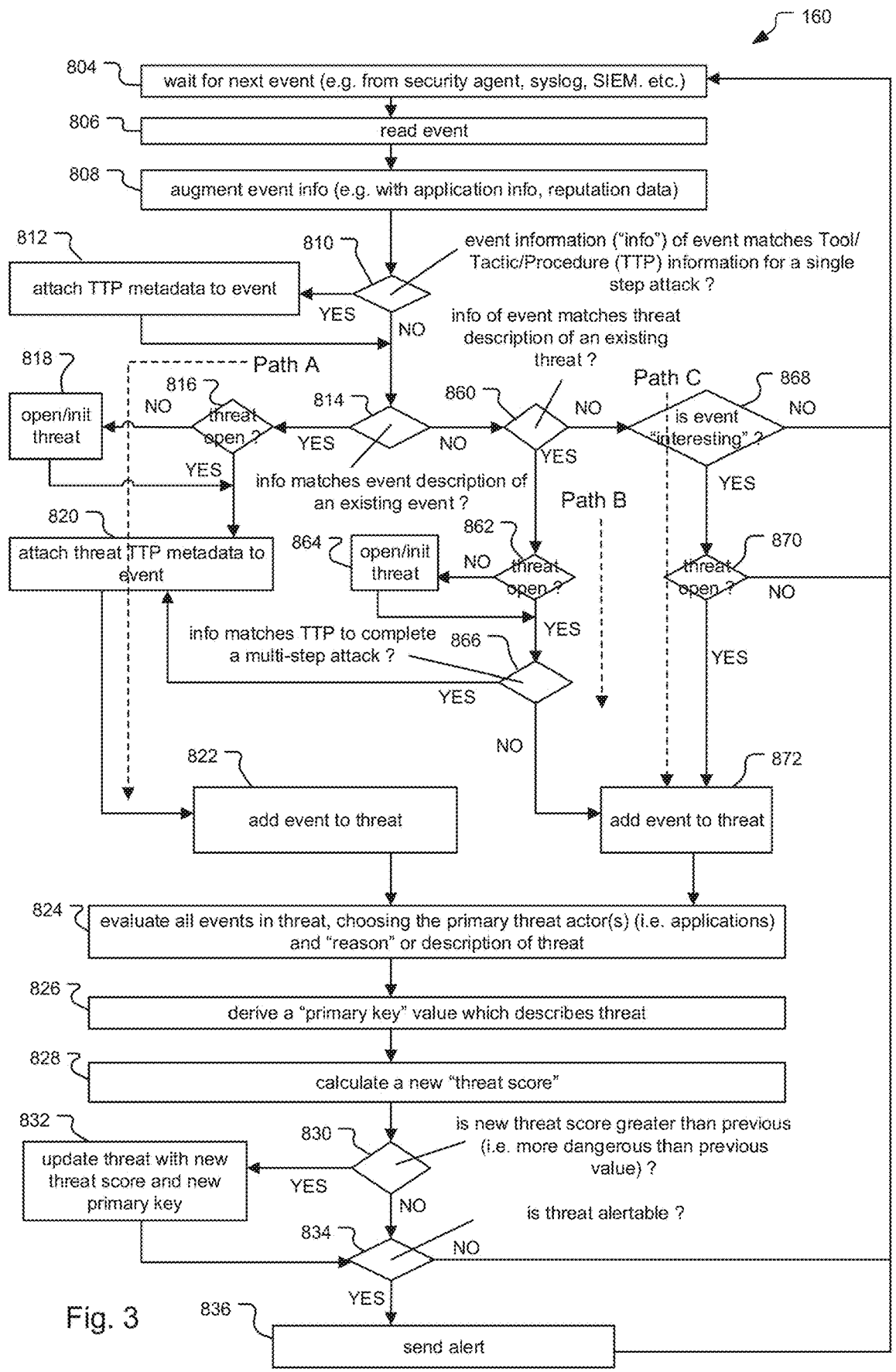
FIG. 3 is a flow diagram describing a method of the threat aggregator for determining threats from events on one or more user devices.

FIG. 3 shows a method for a threat aggregator 160 that determines a threat by analyzing events observed by and sent from a user device. The threat aggregator 160 analyzes each event 60 received, determines whether each event 60 is associated with a known data security issue, and aggregates related events 60 associated with known data security issues into a threat 40. The threat aggregator 160 classifies events as threats in a common way, so that threats may be aggregated from one or more devices as described in FIG. 6 herein below.

During the analysis, an initial set of steps 804 through 810 are traversed, followed by steps along three different paths, labeled Paths A, B, and C. The paths meet at common step 824 and complete at step 836. The description for steps 804 through 810 are first included hereinbelow first, followed by the description for steps of Paths A-C, and then followed by the description for steps 824 through 836.

In step 804, the method waits for the next event (e.g. from security agent, syslog, SIEM. etc.) and reads the event in step 806. In step 808, the method optionally augments the event information 66 of the event 60 with application information and/or reputation data obtained via the policy engine 110 of the endpoint telemetry system 107.

According to step 810, the method compares event information 66 of the event 60 to TTPs 68 of known data security issues to determine whether the event 60 is associated with a TTP 68 describing a "single-step" attack signature. This is among the simplest of the TTPs and is analyzed first. Upon finding a match, the method attaches the matching TTP 68 and/or metadata of the matching TTP in step 812. When no match is found and upon conclusion of step 812, the method transitions to step 814.

In step 814, the method determines whether the event information 66 of the event 60 matches an event description 62 of an existing event 60 previously received, analyzed, and included within an existing threat 40 created by the threat aggregator 160. This is a preferred way for the threat aggregator 160 to determine whether one event 60 is related to another event 60. If the statement is true, the method transitions to step 816 to execute the steps of Path A. Otherwise the method transitions to step 860.

Figure 4:
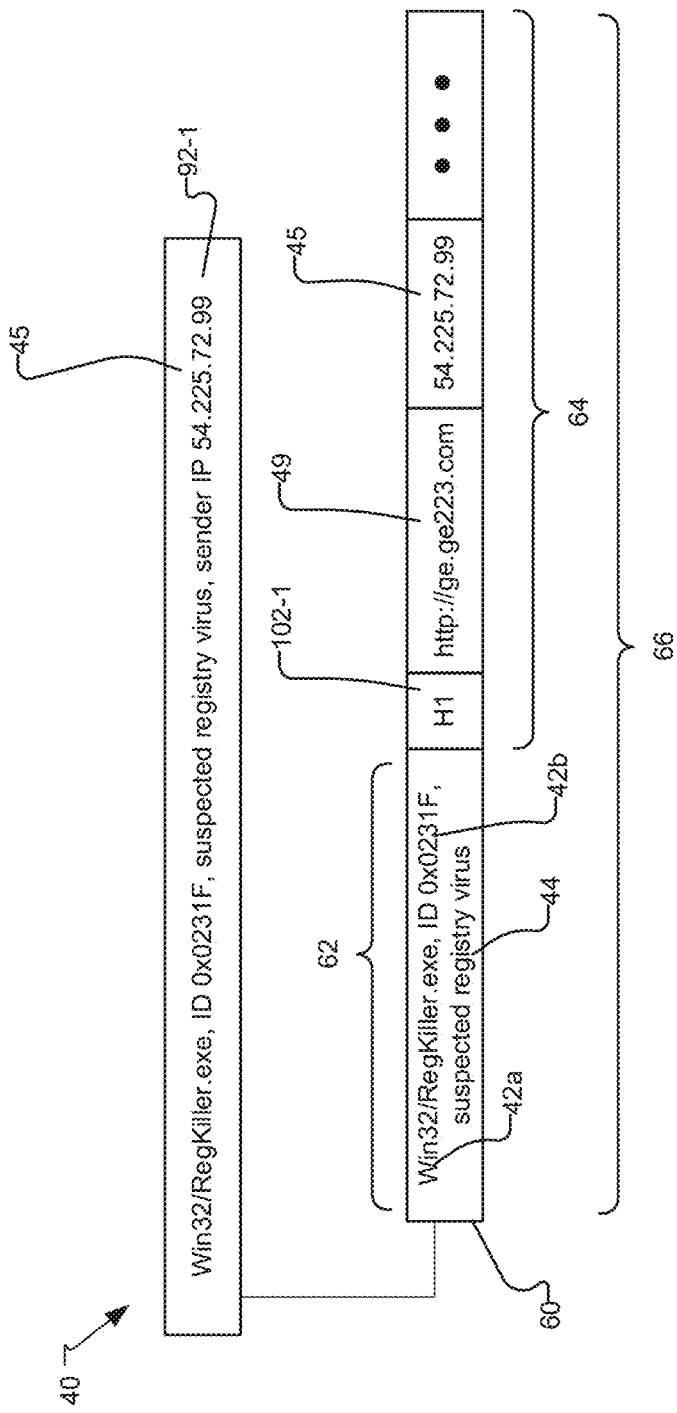
FIG. 4 is a block diagram showing a notional threat record ("threat") created by the threat aggregator in response to receiving the event of FIG. 2A, where the threat aggregator creates the threat in response to determining that the event of FIG. 2A is associated with a known data security issue and then includes the contents of the event within the threat.

FIG. 4 shows the relationship between threats 40 and events 60. The event 60 is represented differently and includes less detail than the event 60 in FIG. 2A to focus on the relationship between the event 60 and the threat 40.

The threat aggregator 160 creates threats 40 based upon the event information 66 of events 40 that threat aggregator 160 receives from one or more user devices 102. Not all events 40 result in the creation of threats 40. Rather, the threat aggregator 160 creates threats from events 40 that the threat aggregator 160 determines are associated with actual/known data security issues. The threat aggregator 160 determines whether events 60 are associated with actual/known data security issues, in one example, by comparing the event information 66 of the events 60 against TTPs 68 of known data security issues obtained via the policy engine 110 of the endpoint telemetry system 107.

Each threat 40 includes one or more related events 60. The related events 60 are associated with the same and/or similar data security issue. In one implementation, the threat aggregator 160 determines whether events 40 are related by matching their event descriptions 62. In another implementation, the threat aggregator 160 determines whether events 40 are related by matching corresponding fields within the event descriptions 62 of the events.

In the illustrated example, threat 40 includes a threat description 92-1 that describes the threat, and includes one event 60. The threat description 92-1 typically includes the contents of the event description 62 of at least one of its events 60, and can additionally include information selected from the event information 66 of one or more of its events 60. For example, the threat description 92-1 includes the contents of event description 62, and additionally includes sender IP address 45 "54.225.72.99" which the threat aggregator selected from the event information 66 of the event 60. While not shown, the threat 40 can also include threat-level TTP information obtained via the policy engine 110 of the endpoint telemetry system 107.

Returning to FIG. 3, step 816 is the first step in Path A.

In step 816, because the events 60 are related, the method determines whether the threat 40 including the existing event 60 is open for editing. If the threat 40 is not open for editing, the method opens the threat in step 818. When the threat is open for editing and upon conclusion of step 818, the method transitions to step 820, which attaches threat TTP metadata to the event 60. In one example, the TTP metadata is a searchable label (or string) which provides context on how this event relates to the threat (e.g. this event represents a "code injection"). In step 822, the method adds the event 60 to the threat 40.

In step 860, the method determines whether the event information 66 of the event 60 matches a threat description 92 of an existing threat 40. If this is true, the method transitions to step 862 to process the steps of Path B. If this is false, the method transitions to step 866 to process the steps of Path C.

At the beginning of Path B, the method has already determined that the event information 66 of the event 60 matches an existing threat 40 (e.g. matches a threat description 92 of an existing threat 40). The method then transitions to step 862 to determine whether the threat 40 is open for editing. If the threat 40 is not open for editing, the method opens the threat in step 864. When the threat is open for editing and upon conclusion of step 862, the method transitions to step 866.

In step 866, the method additionally determines whether the event information 66 of the event 60 additionally matches a TTP 62 describing a multi-step attack signature. If this statement is true, the method appends threat TTP 62 metadata for the TTP 62 describing the multi-step attack signature to the event in step 820 and adds the event 60 to the threat 40 in step 822. Otherwise, the method transitions from step 866 to step 872 and adds the event 60 to the threat 40.

At the beginning of Path C, the method has already determined that the event 60 is not related to another event 60 and that the event information 66 of the event 60 does not match the threat description 92 of any threat 40. The method then transitions to step 862 to determine whether the event 60 could otherwise be "interesting." In one example, event information 66 of an interesting event 60 that may not otherwise match a known TTP 62 could describe a web page alert generated in response to a suspicious business transaction, such as a wire transfer. If the event 60 is determined to not be interesting, the event 60 is discarded and the method transitions back to step 804 to process additional events 60.

If the event 60 is interesting, the method transitions to step 870 to determine whether a threat 40 is already open for this device. If no threat 49 is open, the event 60 is discarded and the method transitions back to step 804 to process additional events 60. Otherwise, the method transitions to step 872 and adds the event 60 to the threat 40.

Paths A, B, and C then meet at common step 824.

In step 824, the method evaluate all events 60 in the threat 40, choosing the primary threat actor(s) (i.e. applications) and "reason" or description 92 of the threat 40. According to step 826, the method then derives a primary key value which describes the threat. In one example, the primary key is the threat description 92. In another example, the primary key is a new field or value that the threat aggregator 160 adds to the threat and is derived from the threat description 92.

In step 828, the method then calculates a new threat score for the threat 40. In step 830, the method then determines whether the new threat score is greater or worse than a previous threat score for the threat 40, which indicates that the threat 40 is more dangerous. If the threat score is greater, the method transitions to step 832 and updates the threat 40 with the new threat score and primary key. Otherwise the method transitions to step 834. According to step 834, the method determines whether the threat 40 is alertable. If the method is alertable, the method transitions to step 836 to send an alert and then transitions to step 804 to process more events 60. If the event is not alertable in step 834, the method transitions to step 804 to process more events 60.

Figure 5:
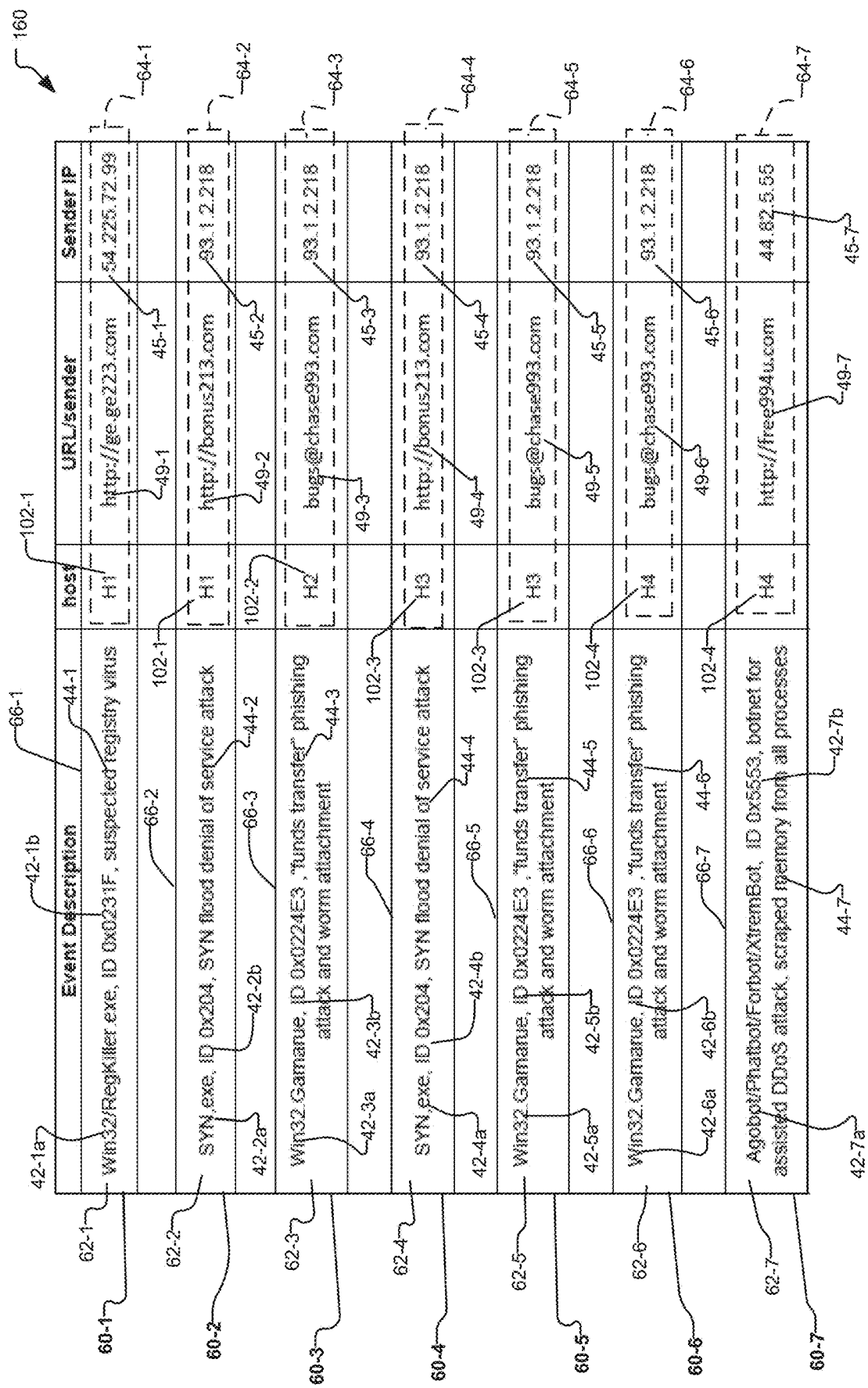
FIG. 5 shows exemplary events received by a threat aggregator from different user devices within an organization.

FIG. 5 shows exemplary events 60 received by a threat aggregator 160. Seven exemplary events 60-1 through 60-7 are shown. The event information 66 of the events 60 is provided in a different format than the event of FIG. 2A for illustration purposes and includes only a subset of typical event details 64. Events 60-1 and 60-7 are described in more detail hereinbelow.

Event 60-1 includes event information 66-1. The event information 66-1 includes event description 62-1 and event detail 64-1. Event description 62-1 includes application name 42-1a with value "Win32/RegKiller.exe," application ID 42-1b with value "0x0231F," and summary text 44-1 with value "suspected registry virus." Event detail 64-1 includes a reference to the user device 102-1 (e.g. H1) that observed and sent the event 60-1, a domain name 49-1 with value "http://ge.ge223.com," and a sender IP 45-1 with value "54.225.72.99".

Event 60-2 includes event information 66-2. The event information 66-2 includes event description 62-2 and event detail 64-2. Event description 62-2 includes application name 42-2a with value "SYN.exe," application ID 42-2b with value "0x0204," and summary text 44-2 with value "SYN flood denial of service attack." Event detail 64-2 includes a reference to the user device 102-1 (e.g. H1) that observed and sent the event 60-2, a domain name 49-2 with value "http://bonus213.com," and a sender IP 45-2 with value "93.1.2.218".

Event 60-3 includes event information 66-3. The event information 66-3 includes event description 62-3 and event detail 64-3. Event description 62-3 includes application name 42-3a with value "Win32.Gamarue," application ID 42-3b with value "0x0224E3," and summary text 44-3 with value "funds transfer phishing attack and worm attachment." Event detail 64-3 includes a reference to the user device 102-2 (e.g. H2) that observed and sent the event 60-3, a domain name 49-3 with value "bugs@chase993.com," and a sender IP 45-3 with value "93.1.2.218".

Event 60-4 includes event information 66-4. The event information 66-4 includes event description 62-4 and event detail 64-4. Event description 62-4 includes application name 42-4a with value "SYN.exe," application ID 42-4b with value "0x0204," and summary text 44-4 with value "SYN flood denial of service attack." Event detail 64-4 includes a reference to the user device 102-3 (e.g. H3) that observed and sent the event 60-4, a domain name 49-4 with value "http://bonus213.com," and a sender IP 45-4 with value "93.1.2.218".

Event 60-5 includes event information 66-5. The event information 66-5 includes event description 62-5 and event detail 64-5. Event description 62-5 includes application name 42-5*a* with value "Win32.Gamarue," application ID 42-5*b* with value "0x0224E3," and summary text 44-5 with value "funds transfer phishing attack and worm attachment." Event detail 64-5 includes a reference to the user device 102-3 (e.g. H3) that observed and sent the event 60-5, a domain name 49-5 with value "bugs@chase993.com," and a sender IP 45-5 with value "93.1.2.218".

Event 60-6 includes event information 66-6. The event information 66-6 includes event description 62-6 and event detail 64-6. Event description 62-6 includes application name 42-6*a* with value "Win32.Gamarue," application ID 42-6*b* with value "0x0224E3," and summary text 44-6 with value "funds transfer phishing attack and worm attachment." Event detail 64-6 includes a reference to the user device 102-4 (e.g. H4) that observed and sent the event 60-6, a domain name 49-6 with value "bugs@chase993.com," and a sender IP 45-6 with value "93.1.2.218".

Event 60-7 includes event information 66-7. The event information 66-7 includes event description 62-7 and event detail 64-7. Event description 62-7 includes application name 42-7*a* with value "Agobot/Phatbot/Forbot/XtremeBot," application ID 42-7*b* with value "0x5553," and summary text 44-7 with value "botnet for assisted DDoS attack, scraped memory from all processes." Event information 64-7 includes a reference to the user device 102-4 (e.g. H4) that observed and sent the event 60-7, a domain name 49-7 with value "http://free994u.com," and a sender IP 45-7 with value "44.82.5.55".

Figure 6:
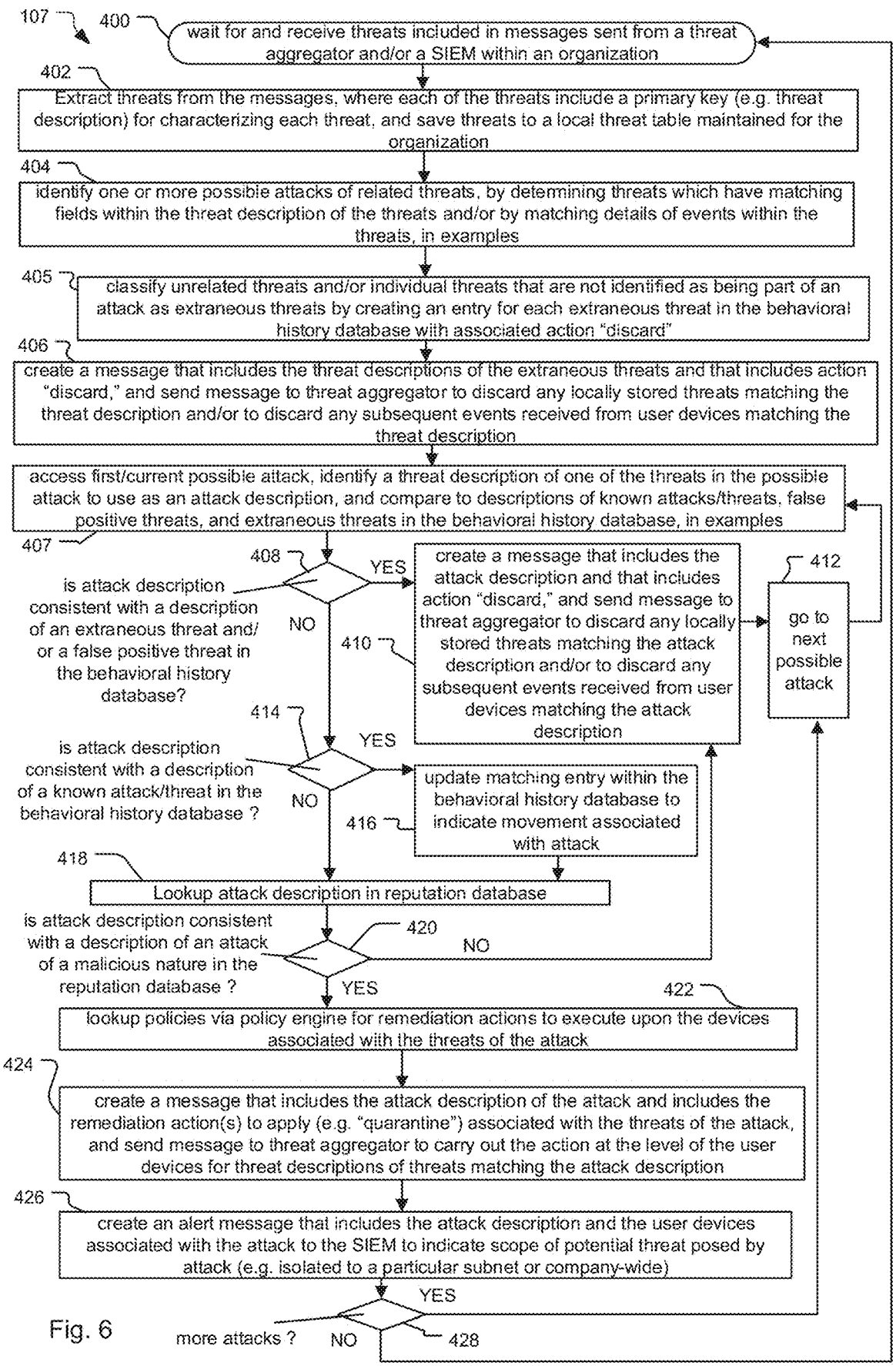
FIG. 6 is a flow diagram describing a method of an endpoint telemetry system for analyzing threats and determining possible attacks from an individual threat or from two or more related threats, where the endpoint telemetry system also provides security policies for responding to the threats.

FIG. 6 is a method of the endpoint telemetry system 107 for analyzing threats 40 at a level of the organization. In step 400, the method waits for and receives threats 40 sent from a SIEM 142 and/or from a threat aggregator 160 within an organization 122. In step 402, the endpoint telemetry system 107 extracts the threats 40 from the messages, where each of the threats 40 include a primary key (e.g. threat description 92) for characterizing each threat, and saves the threats to a local threat table 82 maintained for the organization 122.

Figure 7:
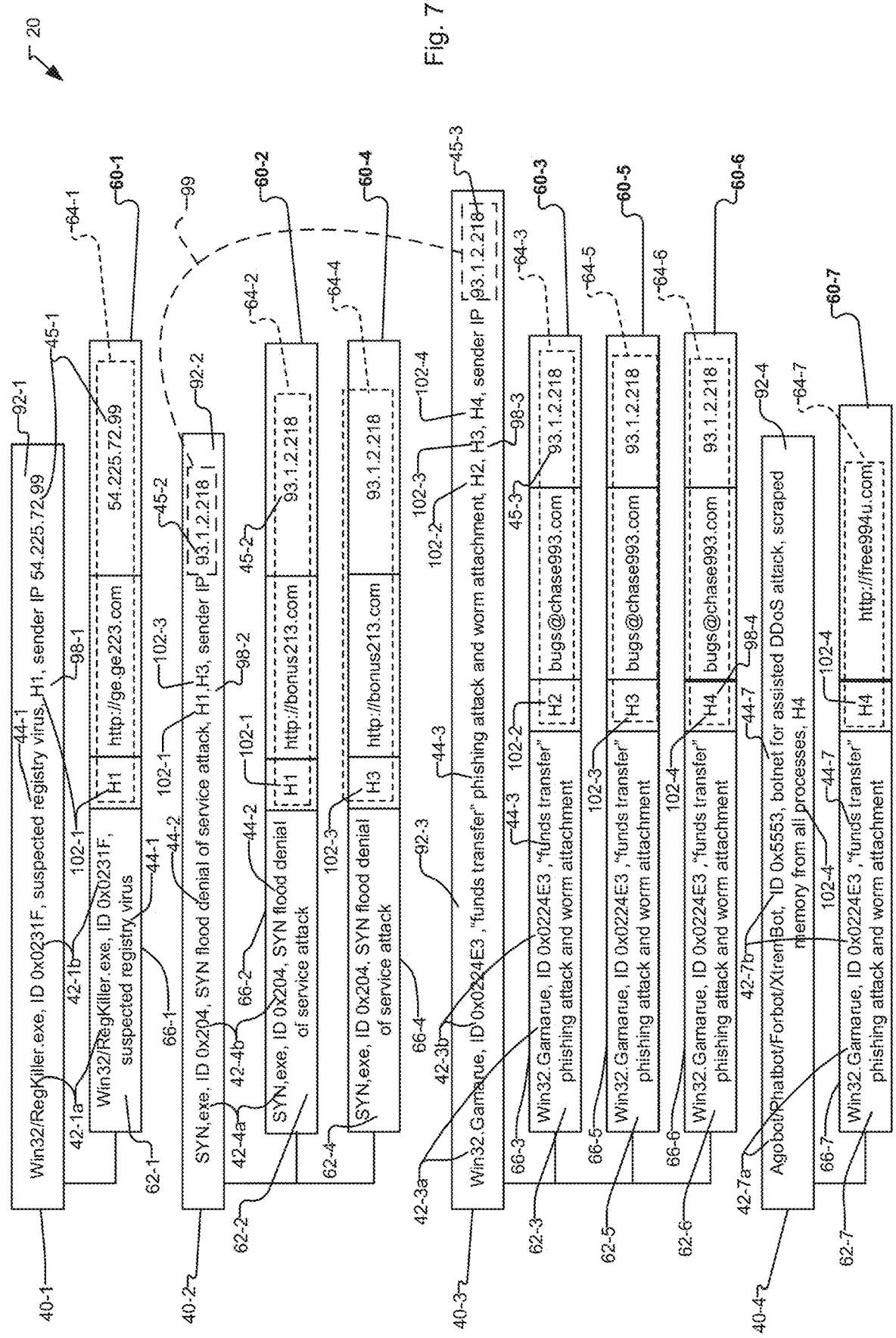
FIG. 7 shows exemplary threats sent from the threat aggregator to the endpoint telemetry system for analysis, where the threat aggregator created the threats by applying the threat aggregator method of FIG. 3 to the events of FIG. 5.

FIG. 7 shows exemplary threats 40 that the endpoint telemetry system 107 has received from a threat aggregator 160 and saved to a local threat table 82 of the endpoint telemetry system 107. The exemplary threats 40 were created and classified by the threat aggregator 160, by applying the threat aggregator method of FIG. 3 to the exemplary events of FIG. 5. Each of the threats 40-1 through 40-4 include a threat description 92-1 through 92-4 and include the events 60-1 through 60-7 of FIG. 5 in various particulars.

Specifically, threat 40-1 includes threat description 92-1 and includes event 60-1. Threat description 92-1 characterizes the threat posed by its events 60 (here, only event 60-1). The threat description 92-1 is derived from one or more events 40-1 included within the threat 40-1, in one example. In the illustrated example, threat description 92-1 includes the event description 62-1 of event 60-1 and additionally includes sender IP "54.225.72.99" from the event information 64-1 of event 60-1. In a preferred embodiment, the threat description 62-1 includes a name 42-1*a* and/or identifier 42-1*b* of one or more applications involved, text 44-1 describing the threat, a list 98-1 of user devices 102 affected by the threat (here, user device H1/102-1) and optionally TTPs 62 involved. The list 98-1 of user devices 102-1 affected by the threat 40-1 is typically derived from (e.g. copied from or logically linked to) the events 60 included within each threat 40-1.

Threat 40-2 has threat description 92-2 and includes two related events 60-2 and 60-4. Events 60-2 and 60-4 are related because the threat aggregator 160 determined that the event descriptions 62-1/62-4 of these events included one or more matching fields, in one example. Threat description 92-2 includes a name 42-4*a* and/or ID 42-4*b* of one or more applications involved, text 44-2 describing the threat, and a list 98-2 of user devices 102 affected (here, user devices H1/102-1 and H3/102-3). Threat description 92-2 additionally includes sender IP 45-2, "93.1.2.218".

Threat 40-3 has threat description 92-3 and includes three related events 60-3, 60-5, and 60-6. Events 60-3, 60-5, and 60-6 are related because the threat aggregator 160 determined that the event descriptions 62-3/62-5/62-6 of these events included one or more matching fields, in one example. Threat description 92-3 includes a name 42-3*a* and/or ID 42-3*b* of one or more applications involved in the threat 40-3, text 44-3 describing the threat, and list 98-3 of user devices 102 affected (here, user devices H2/102-2, H3/102-3, and H4/102-4). Threat description 92-2 additionally includes sender IP 45-2, "93.1.2.218".

Of particular interest is the fact that threats 40-2 and 40-3 may be related. Though the text and application names/IDs of threat descriptions 92-2 and 92-3 of these threats describe different threats and reference different applications involved in the threats, respectfully, sender IP address "93.1.2.218" is in common. This is indicated by reference 99. Related threats 40 could be indicative of a larger attacks on the organization 122.

Finally, threat 40-4 has threat description 92-4 and includes one event 60-7. Threat description 92-4 includes a name 42-7*a* and/or ID 42-7*b* of one or more applications involved, text 44-7 describing the threat, and list 98-4 of user devices 102 affected (here, user device H4/102-4).

Returning to FIG. 6, in step 404, the method identifies one or more possible attacks of related threats 40. In one example, the endpoint telemetry system 107 identifies a possible attack of related threats 40 when two or more threats 40 having similar threat descriptions 92 affect different user devices 102. In another example, the endpoint telemetry system 107 identifies a possible attack when two or more threats 40 having different threat descriptions 92 affect the same user device 102. To determine whether threats 40 are related, the endpoint telemetry system matches fields within the threat description 92 of the threats and/or by matching details 64 of events 60 within the threats 40, in examples.

According to step 405, the method classifies unrelated threats and/or threats that are not identified as being part of an attack as extraneous threats by creating an entry for each extraneous threat in the behavioral history database 118 with associated action "discard." For example, these may match criteria from previous threats, which were deemed to be False Positives by the system or administrator. I.e. a previous matching threat was dismissed.

In step 406, the method creates a message that includes the threat descriptions 92 of the extraneous threats and that includes action "discard," and sends the message to the threat aggregator 160 to discard any locally stored threats 40 matching the threat descriptions 92 of the extraneous threats and to discard any subsequent events 60 received from user devices 102 matching the threat descriptions 92 of the extraneous events. By characterizing possibly thousands of false positive events 60 sent from multiple user devices as being associated with a much smaller number of single extraneous events 60 to be discarded, in one example, the endpoint telemetry system 107 in conjunction with the threat aggregator 160 can improve processing overhead for analyzing events 60 and determining threats 40 from the events 60.

In step 407, the method accesses a possible attack of related threats determined in step 404. The method identifies a threat description 92 of one of the threats 40 in the possible attack to use as an attack description for the attack, and compares the attack description to descriptions of known attacks/threats, false positive threats, and extraneous threats in the behavioral history database 118, in examples. Then, in step 408, the method determines whether the attack description matches/is consistent with a description of an extraneous threat and/or a false positive threat in the behavioral history database 118. If the attack is associated with an extraneous or false positive threat, the method transitions to step 410. Otherwise, the method transitions to step 414.

In step 410, the method creates a message that includes the attack description (of the attack determined to be associated with extraneous threats) and that includes action "discard," and sends the message to the threat aggregator 160 to discard any locally stored threats 40 matching the attack description and to discard any subsequent events 60 received from user devices 102 matching the attack description.

For example, once the endpoint telemetry system 107 sends a description of the extraneous threat in conjunction with the "discard" action to the threat aggregator 160, the threat aggregator 160 can save the threat description 92 and action to the local site log 20 and update its rules 18 accordingly. Then, when the threat aggregator 160 receives new events 60 from user devices 102, the threat aggregator 160 can first execute a local lookup of the event 60 via its event description 62 against the locally stored threat descriptions 92 of the extraneous threats 40. Because the threat descriptions 92 of the extraneous threats 40 can characterize a wide range of false positive events 60, possibly thousands of discrete events 60 of a false positive or nuisance nature can be effectively discarded as a single extraneous threat, saving the threat aggregator 160 from executing its more detailed event/threat processing.

Upon conclusion of step 410, the method then transitions to step 412 to go to the next possible attack, and transitions to step 408 to access and process the next attack of related threats 40. The method then continues in step 414.

According to step 414, the method determines whether the attack (via its attack description) is consistent with a description of a known attack/threat in the behavioral history database 118. For this purpose, in one example, a description of a known attack can indicate that regardless of the malware application 42 referenced within the threats 40 of an attack, any threats 40 that originated from sender IP address 64 having a value of "93.1.2.218" should be treated as part of a common attack. In another implementation, the method determines whether the attack is consistent with a known attack by comparing its attack description against TTPs 64 of known attacks in the behavioral history database 118.

If the attack is consistent with a known attack, the method transitions to step 416 and updates the matching entry within the behavioral history database to 118 indicate breaches and/or movement associated with the attack. Movement refers to whether an attack has increased or decreased in frequency, or stayed the same (e.g. lateral movement). Upon conclusion of step 416 and when the method the attack is not consistent with a known attack, the method transitions to step 418.

In step 418, the method executes a lookup of the attack description for the attack in the reputation database 116. According to step 420, the method determines whether the attack description consistent with a description of an attack of a malicious nature in the reputation database 116. If the attack is not determined to be of a malicious nature, the method transitions to step 410, otherwise the method transitions to step 422.

According to step 422, the method executes a lookup of security policies via the policy engine 118 for remediation actions to execute upon the devices associated with the threats 40 of the attack. In step 424, the method then creates a message that includes the attack description of the attack and includes the remediation action(s) to apply (e.g. "quarantine") associated with the threats of the attack in the message. The endpoint telemetry system 107 then sends the message to the threat aggregator 160 to carry out the action at the level of the user devices 102.

In response, in one example, the threat aggregator 160 extracts the attack descriptions and associated actions from the messages, matches the attack descriptions against threat descriptions of threats 40 within its local site log 20, and executes the actions against threats 40 having threat descriptions 92 matching the attack descriptions.

In step 426, the method creates an alert message that includes the attack description and the user devices associated with the attack and sends the message to the SIEM, to indicate a scope of potential threat posed by attack (e.g. isolated to a particular subnet or company-wide). The method determines whether there are any more attacks of related threats 40 to process in step 428, transitions to step 412 if there are more attacks to process, or transitions back to step 400 to await more threats 40 sent from a SIEM 142 and/or threat aggregator 160.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for responding to data security threats in an organization by a threat aggregator service executing on an analysis computing system, the method comprising:
   receiving a plurality of events observed and sent by a plurality of user devices from within the organization;
   integrating, at an organizational level, one or more events of the plurality of events that are associated with known data security issues;
   based on the integrating, updating existing threats to data security within the organization;
   providing the updated threats to an endpoint telemetry system wherein the endpoint telemetry system is configured to identify attacks upon the data security within the organization based on the updated threats;
   receiving security policies from the endpoint telemetry system that specify actions for responding to the updated threats associated with the identified attacks; and
   performing one or more remediation actions based on the received security policies, thereby protecting the organization from the identified attacks.

2. The method of claim 1, further comprising
  determining whether at least one event of the integrated plurality of events is extraneous and associated with a false positive; and
  upon determining that the at least one event is associated with the false positive, discarding the at least one event.

3. The method of claim 1, further comprising determining that the one or more events of the integrated plurality of events are associated with the known data security issues at least by comparing event information of the one or more events to Tools/Tactics/Procedures (TTPs) of the known data security issues, and appending TTPs of the known data security issues to matching events of the one or more events that match the TTPs of the known data security issues.

4. The method of claim 1, further comprising at least one event of the integrated plurality of events including descriptions characterizing the at least one event, and wherein the descriptions include:
  a summary text that describes the at least one event;
  at least one of a name and/or an identifier of a user device of the plurality of user devices that sent the at least one event; and
  at least one of a name and/or an identifier of at least one application executing on the user device, the at least one application identified as being a source of the at least one event.

5. The method of claim 1, further comprising attributing the updated threats to a specific threat actor associated with an attack campaign targeting the organization.

6. The method of claim 1, wherein updating the existing threats within the organization comprises:
  receiving an event from a user device;
  generating a new threat in response to determining that a description of the received event does not match a description of the existing threats within the organization, adding the event to the new threat, and copying the description of the event to the description of the new threat; and
  updating the existing threats to include the received event upon the description of the event matching the description of the existing threats.

7. The method of claim 1, wherein updating the existing threats within the organization comprises:
  receiving an event from a user device;
  generating a new threat in response to determining that one or more fields of a description of the received event do not match corresponding fields of a description of the existing threats within the organization, adding the event to the new threat and copying the description of the event to the description of the new threat; and
  updating the existing threats to include the received event upon the one or more fields of the description of the received event matching one or more corresponding fields of the description of the existing threats.

8. The method of claim 1, further comprises calculating a new threat score for the updated threats and determining whether the new threat score is greater than a previous threat score associated with the existing threats, and upon determining that the new threat score is greater than the previous threat score, identifying the updated threats as more dangerous than the existing threats.

9. The method of claim 1, wherein identifying the attacks upon the data security within the organization based on the updated threats comprises matching fields within descriptions of new threats to determine whether the new threats are related, and associating the related new threats with possible attacks on the data security within the organization.

10. The method of claim 1, wherein identifying the attacks upon the data security within the organization based on the updated threats comprises:
  identifying the attacks at least by matching possible attacks including one or more related threats to records of known malicious attacks; and
  providing security policies for executing remediation actions with respect to user devices affected by threats associated with the identified attacks.

11. A system for responding to data security threats in an organization, the system comprising:
  an analysis computer system that executes a threat aggregator service, the threat aggregator service:
    receiving a plurality of events observed and sent by a plurality of user devices from within the organization;
    integrating, at an organizational level, one or more events of the plurality of events that are associated with known data security issues;
    based on the integrating, updating existing threats to data security within the organization;
    providing the updated threats to a service on an endpoint telemetry system, wherein the service on the endpoint telemetry system includes a central processing unit (CPU) that is programmed to receive the updated threats, identify attacks upon the data security within the organization based on the updated threats, and provide security policies to the threat aggregator service that specify actions for responding to the updated threats, wherein the threat aggregator service performs one or more remediation actions based on the provided security policies, thereby protecting the organization from the identified attacks.

12. The system of claim 11, wherein the updated threats include one or more related events associated with the known data security issues.

13. The system of claim 11, wherein the threat aggregator service determines that the one or more events are associated with the known data security issues at least by comparing event information of the one or more events to Tools/Tactics/Procedures (TTPs) of the known data security issues, and appending TTPs of the known data security issues to matching events of the one or more events that match the TTPs of the known data security issues.

14. The system of claim 11, wherein the plurality of events includes descriptions characterizing each event of the plurality of events, and wherein the descriptions include: a summary text that describes each event; a name and/or an identifier of a user device that sent each event; and a name and/or an identifier of at least one application executing on the user device, the at least one application identified as being a source of the plurality of events.

15. The system of claim 11, wherein the updated threats include one or more related events and a threat description that includes contents of descriptions of the one or more related events.

16. The system of claim 11, wherein the threat aggregator service updates the existing threats within the organization at least by:
  receiving an event from a user device;
  generating a new threat in response to determining that a description of the received event does not match descriptions of the existing threats within the organization, adding the event to the new threat, and copying the description of the event to the description of the new threat; and updating the existing threats to include the received event when a description of the event matches the description of the existing threats.

17. The system of claim 11, wherein the threat aggregator service updates the existing threats within the organization at least by:
receiving an event from a user device;
generating a new threat in response to determining that one or more fields of a description of the received event do not match corresponding fields of a description of the existing threats within the organization, adding the event to the new threat and copying the description of the event to the description of the new threat; and
updating the existing threats to include the received event when the one or more fields of the description of the event match one or more corresponding fields of the description of the existing threats.

18. The system of claim 11, wherein the threat aggregator service updates existing threats at least by identifying one or more user devices affected by the updated threats based on the one or more events, and indicating the identified one or more user devices affected by the updated threats in descriptions of the updated threats.

19. The system of claim 11, wherein the service on the endpoint telemetry system includes the CPU that is programmed to attribute the updated threats to a specific threat actor associated with an attack campaign targeting the organization.

20. The system of claim 11, wherein the service on the endpoint telemetry system includes the CPU that is programmed to identify the attacks at least by matching possible attacks including one or more related threats to records of known malicious attacks and to send the identified attacks and remediation actions to the threat aggregator service, wherein the threat aggregator service executes the remediation actions with respect to user devices affected by threats associated with the identified attacks.

21. The system of claim 11, wherein the service on the endpoint telemetry system includes the CPU that is programmed to calculate a new threat score for the updated threats and determine whether the new threat score is greater than a previous threat score associated with the existing threats, and upon determining that the new threat score is greater than the previous threat score, identify the updated threats as more dangerous than the existing threats.

22. The system of claim 11, further comprising a Security Information and Event Manager (STEM) within the organization that receives threats sent from the threat aggregator service, stores the threats in log files, and provides the log files including the threats to the service on the endpoint telemetry system.

23. A method for responding to data security threats in an organization, the method comprising:
receiving, by a threat aggregator service executing on an analysis computing system, a plurality of events observed and sent by a plurality of user devices from within the organization;
correlating, at an organizational level, two or more events of the plurality of events;
based on the correlating, creating a threat, wherein individually each of the plurality of events does not indicate any threat;
providing the threat to an endpoint telemetry system wherein the endpoint telemetry system is configured to identify attacks upon the data security within the organization based on the threat; and
receiving, by the threat aggregator service, security policies from the endpoint telemetry system that specify actions for responding to the threat associated with the identified attacks, wherein the threat aggregator service performs one or more remediation actions based on the received security policies.

24. One or more non-transitory computer readable media embodying instructions for responding to data security threats in an organization, that when executed by at least one processor, cause the at least one processor to:
receive, by a threat aggregator service executing on an analysis computing system, a plurality of events observed and sent by a plurality of user devices from within the organization;
integrate, at an organizational level, one or more events of plurality of events that are associated with known data security issues;
based on the integrating, update existing threats to data security within the organization;
provide the updated threats to a service on an endpoint telemetry system, wherein the service on the endpoint telemetry system is programmed to identify attacks upon the data security within the organization based on the updated threats;
receive security policies from the service on the endpoint telemetry system that specify actions for responding to the updated threats associated with the identified attacks; and
perform, by the threat aggregator service, one or more remediation actions based on the received security policies, thereby protecting the organization from the identified attacks.

* * * * *